(12) United States Patent
Langer et al.

(10) Patent No.: US 8,831,531 B2
(45) Date of Patent: Sep. 9, 2014

(54) SYSTEMS AND METHODS FOR MEASURING A SIGNAL QUALITY BETWEEN AN ENTERTAINMENT DEVICE AND A REMOTE CONTROL

(75) Inventors: Paul Anthony Langer, Westminster, CO (US); Pujitha Davuluri, Hillsboro, OR (US)

(73) Assignee: EchoStar Technologies L.L.C., Englewood, CO (US)

( * ) Notice: Subject to any disclaimer, the term of this patent is extended or adjusted under 35 U.S.C. 154(b) by 266 days.

(21) Appl. No.: 13/299,185

(22) Filed: Nov. 17, 2011

(65) Prior Publication Data

US 2013/0128941 A1    May 23, 2013

(51) Int. Cl.
*H04B 17/00*    (2006.01)
*G08C 23/04*    (2006.01)
*G08C 17/02*    (2006.01)

(52) U.S. Cl.
CPC ............ *G08C 17/02* (2013.01); *H04B 17/0042* (2013.01); *G08C 23/04* (2013.01)
USPC .................. 455/67.14; 455/67.11; 455/67.13; 455/67.7; 455/41.2; 455/41.3; 725/139; 725/141; 348/14.02; 348/14.04; 348/14.05

(58) Field of Classification Search
USPC ............. 455/423, 425, 41.1, 41.3, 3.05, 3.06, 455/67.11, 67.13, 67.14, 67.7, 556.1, 556.2, 455/41.2; 348/14.01–14.05, 14.07, 14.12; 725/72, 139, 140, 141
See application file for complete search history.

(56) References Cited

U.S. PATENT DOCUMENTS

| | | | |
|---|---|---|---|
| 6,075,330 A * | 6/2000 | Terk .............................. 318/280 |
| 6,216,266 B1 * | 4/2001 | Eastman et al. ................ 725/72 |
| 6,766,100 B1 * | 7/2004 | Komar et al. .................. 386/230 |
| 6,778,225 B2 * | 8/2004 | David ........................... 348/734 |
| 7,286,190 B2 * | 10/2007 | Klopfenstein et al. ........ 348/569 |
| 2004/0226034 A1 * | 11/2004 | Kaczowka et al. ............... 725/9 |

* cited by examiner

*Primary Examiner* — Tuan A Tran
(74) *Attorney, Agent, or Firm* — Ingrassia Fisher & Lorenz, P.C.

(57) ABSTRACT

Methods and systems are provided for measuring a signal quality between an entertainment device and a remote control. The entertainment device, for example, may include, but is not limited to, a signal receiver, a memory configured to store a predetermined data sequence, and a controller coupled to the signal receiver and the memory. The controller may be configured to receive a data sequence from the signal receiver, compare the received data sequence to the predetermined data sequence, and generate signal quality data on the received data sequence based upon the comparison.

20 Claims, 4 Drawing Sheets

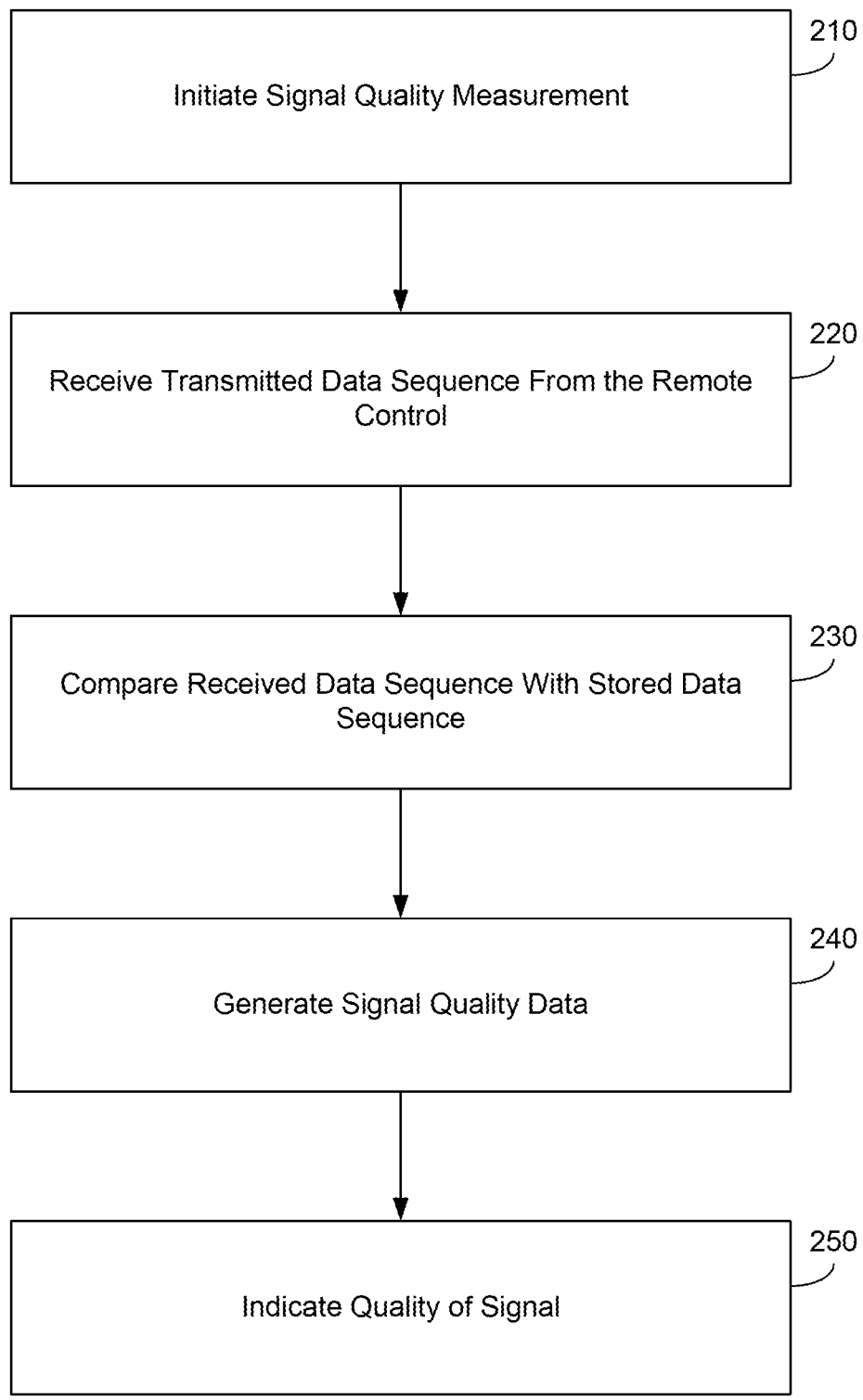

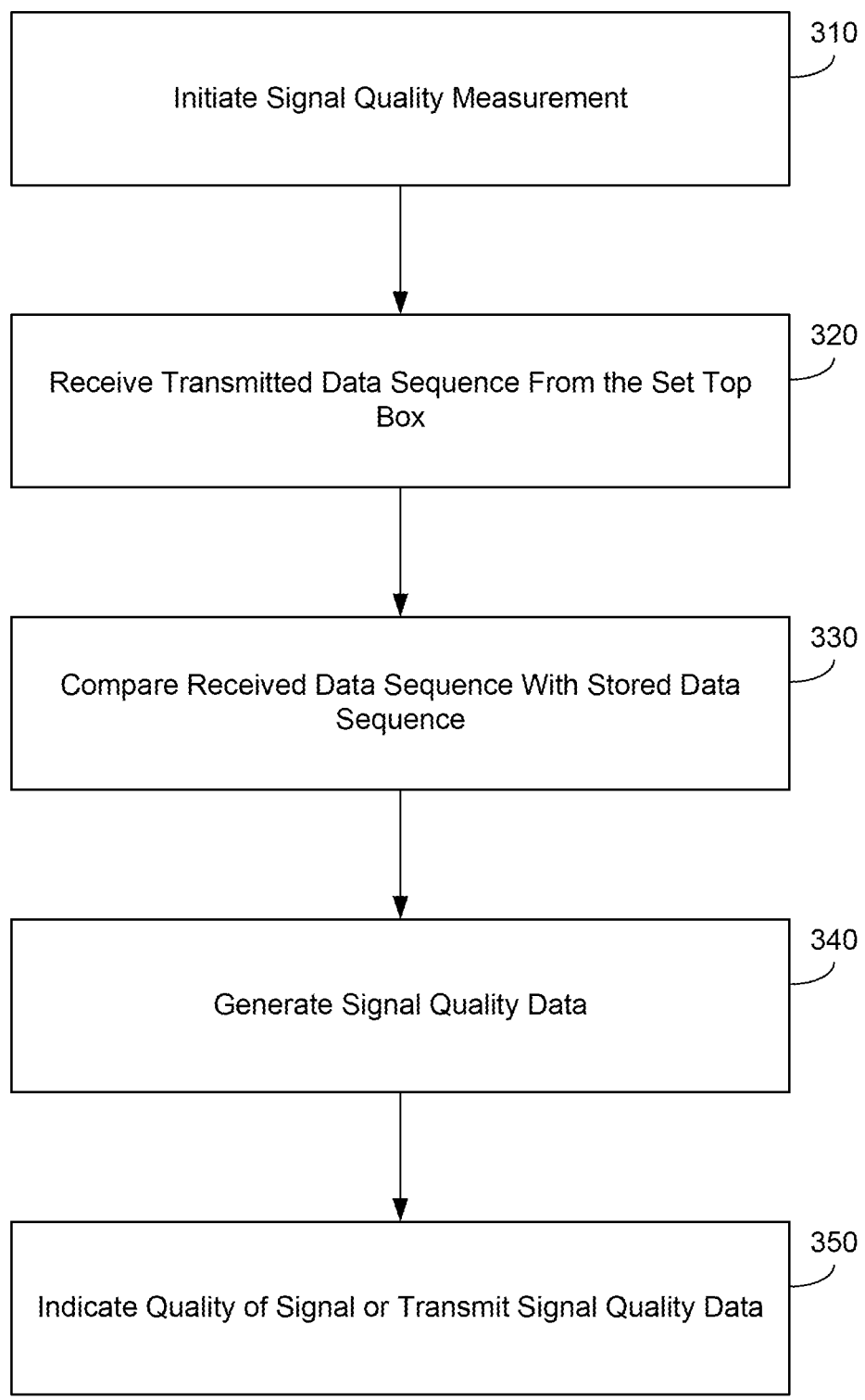

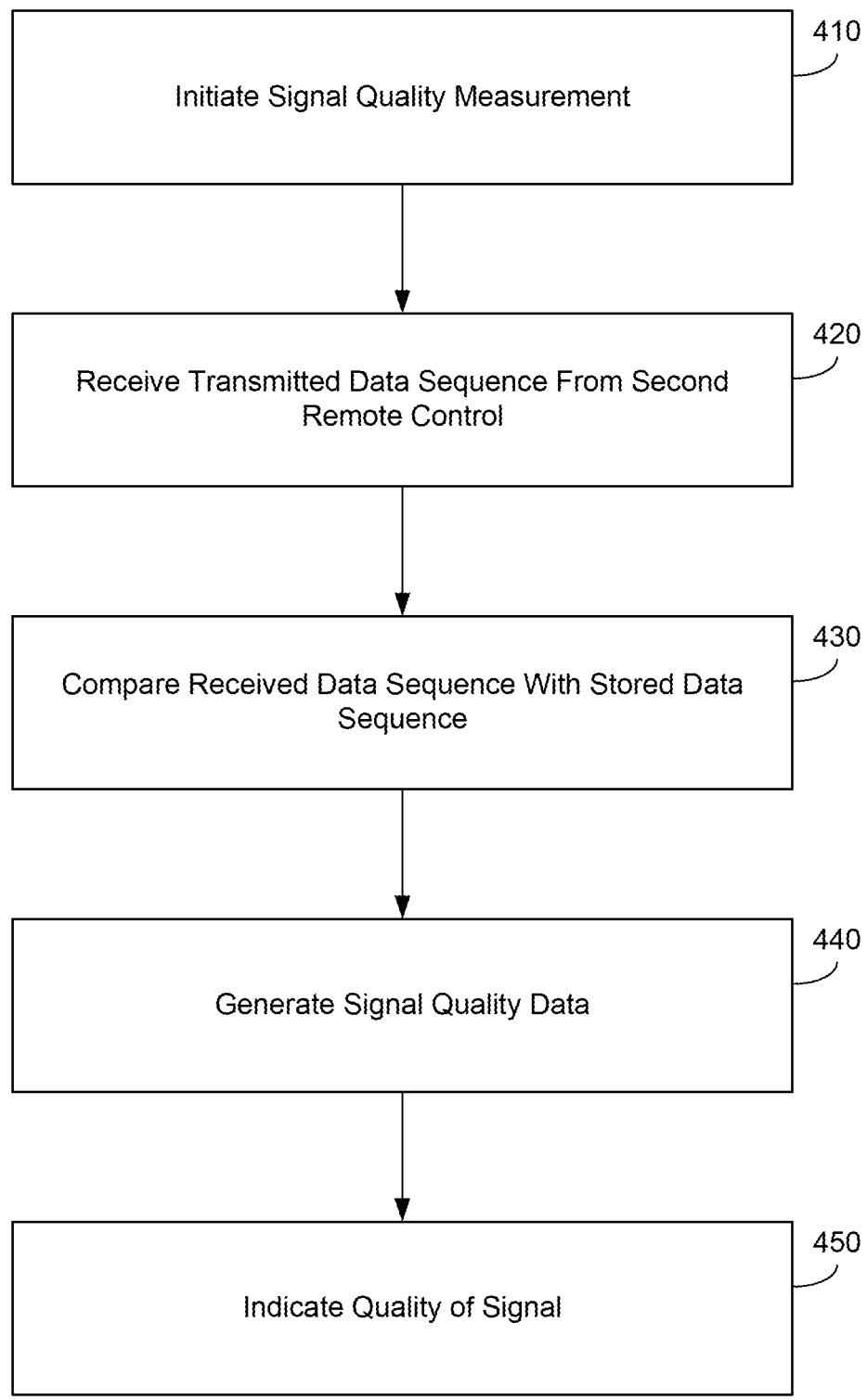

SYSTEMS AND METHODS FOR MEASURING A SIGNAL QUALITY BETWEEN AN ENTERTAINMENT DEVICE AND A REMOTE CONTROL

TECHNICAL FIELD

The following relates to systems and methods for measuring a signal quality between a set top box and a remote control.

BACKGROUND

Remote controls are used in a variety of settings to communicate with set top boxes, televisions, media players, video game players and many other types of audio/visual components. Typically, remote controls use infrared and/or radio frequency (RF) signals to communicate with one or more controlled devices. With either infrared or RF signals, however, environmental factors can degrade or interfere with the signals being passed between the remote control and set top box. Environmental factors that could affect remote control signals include, but are not limited to, Wi-Fi network signals, signals from cellular towers or signal amplifiers (such as 3G amplifiers now found in some homes and offices), Bluetooth devices, cordless telephone systems, other consumer electronic devices and even the building materials or other objects in the residence.

Although various RF signal strength meters for remote controls have been developed to measure the amplitude of signals, most of these meters do not consider the quality of the signals themselves. That is, current metering devices do not account for signal interference or other factors beyond the amplitude of the received signal. As a result, most conventional meters fail to take into account possible interference to the signal caused by any environmental factors.

SUMMARY

In accordance with one embodiment, an entertainment device configured to measure a signal quality between the entertainment device and a remote control is provided. The entertainment device may include, but is not limited to, a signal receiver, a memory configured to store a predetermined data sequence, and a controller coupled to the signal receiver and the memory. The controller may be configured to receive a data sequence from the signal receiver, compare the received data sequence to the predetermined data sequence, and generate signal quality data on the received data sequence based upon the comparison.

In accordance with another embodiment, a method for measuring a signal quality received by a set top box having a controller, a signal receiver coupled to the controller and a memory coupled to the controller is provided. The method may include, but is not limited to, receiving, by the controller, a data sequence from the signal receiver, comparing, by the controller, the received data sequence to a data sequence stored in the memory, and generating, by the controller, signal quality data based upon the comparison.

In accordance with yet another embodiment, a remote control is provided. The remote control may include, but is not limited to, a signal receiver, a memory configured to store a predetermined data sequence, and a controller coupled to the signal receiver and the memory. The controller may be configured to receive a data sequence from the signal receiver, compare the received data sequence to the predetermined data sequence, and generate signal quality data on the received data sequence based upon the comparison.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWING FIGURES

Exemplary embodiments will hereinafter be described in conjunction with the following drawing figures, wherein like numerals denote like elements.

FIG. 2 is a flow diagram illustrating a method for using a video or audio component to measure the quality of the signal between the video or audio component and a remote control, in accordance with an embodiment;

FIG. 3 is a flow diagram illustrating a method for using a remote control to measure the quality of the signal between a video or audio component and the remote control, in accordance with another embodiment; and FIG. 4 is a flow diagram illustrating a method for measuring the quality of the signal between two remote controls, in accordance with an embodiment.

DETAILED DESCRIPTION

Figure 1:
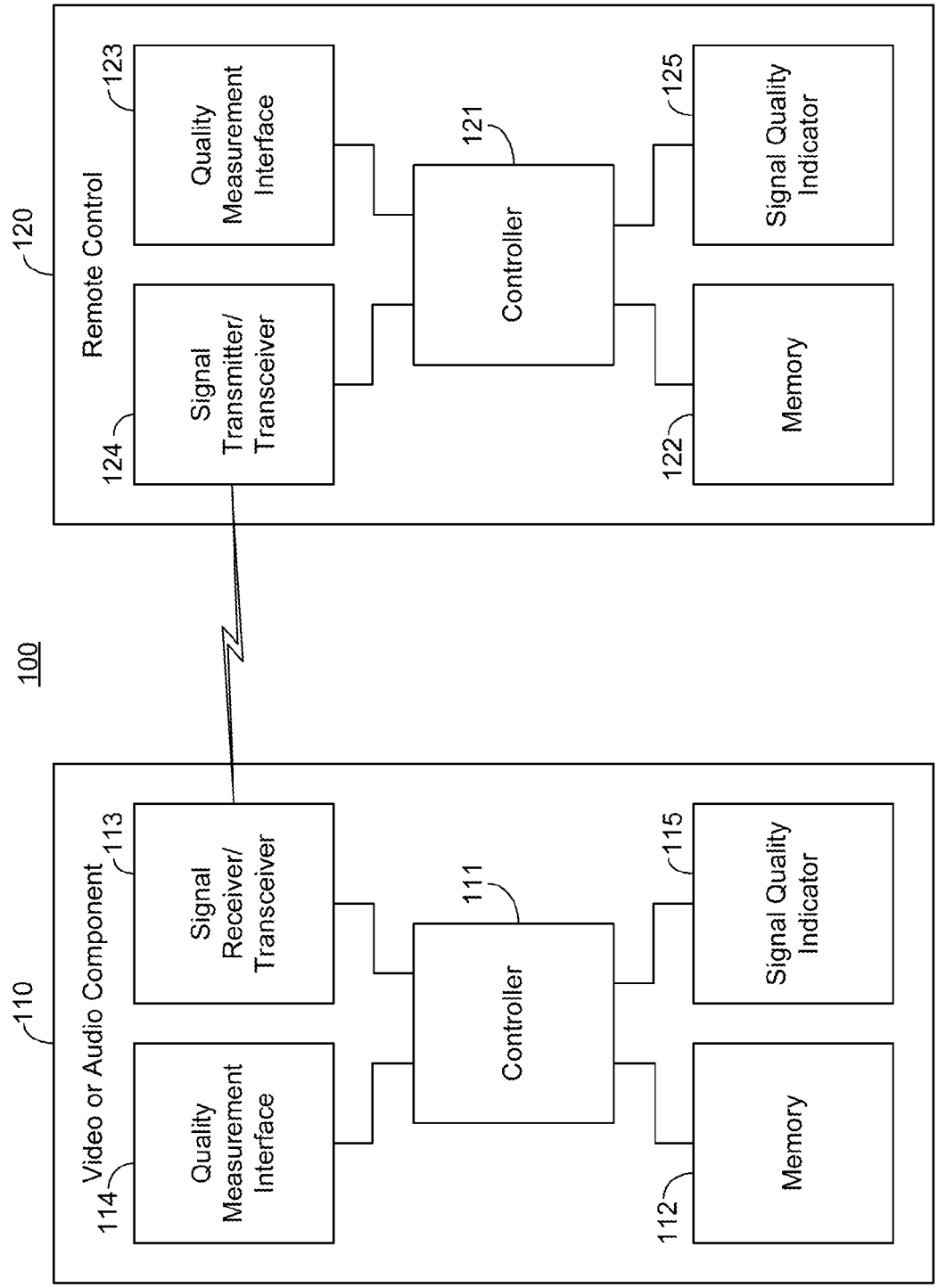
FIG. 1 is a block diagram of an exemplary quality measurement system in accordance with an embodiment.

According to various exemplary embodiments, systems and methods for measuring the quality of a signal between a video or audio component and a remote control are provided. As discussed above, various environmental factors may affect the quality of the signal between a set top box and a remote control without necessarily affecting the amplitude or strength of the signal. By considering the quality of the signal, various embodiments are able to provide a better system metric to the user or troubleshooter than prior metering techniques that focused solely on signal amplitude.

FIG. 1 is a block diagram of an exemplary quality measurement system 100 in accordance with an embodiment. The quality measurement interface 100 includes at least one video or audio component 110 and at least one remote control 120. The video or audio component 110 may be, for example, an entertainment device such as a set top box, a media played (CD, DVD, etc), an audio receiver, a video game system, a wireless device such as a game controller, computer accessories, or any other devices that rely on a wireless link in order to function are also considered. Set top boxes, for example, are typically used to convert signals from a cable or satellite provider into signals that can be used by a television to produce video and sound. The remote control 120 communicates with the video or audio component 110 allowing a user to control the video or audio component 110.

The video or audio component 110 includes a controller 111. Various controllers 111 that may be used include, but are not limited to, central processing units (CPUs), graphical processing units (GPUs), application specific integrated circuits (ASICs), field programmable gate arrays (FPGAs), microcontrollers, or any other type of processor or logic device. The controller 111 is used to control the conversion of a signal from a cable or satellite provider into the signal that can be used by a television to produce video and sound. The controller 111 also controls the quality measurement process, as discussed in further detail below.

The controller 111 is coupled to a memory 112. The memory 112 stores a predetermined data sequence that is used to test the quality of the signal between the video or audio component 110 and remote control 120. Any data sequence may be used to test the signal quality so long as both the video or audio component 110 and remote control 120 each know the sequence. In one embodiment, for example, the predetermined data sequence may be a series of sequential packets that are indexed and unique. The data packets could also include a pseudo random bit sequence. In some embodiments, for example, cyclic redundancy checks (CRCs) or other error assessment data may be included in the predetermined data sequence. In another embodiment, for example, the predetermined data sequence could include diagnostic data. In this embodiment, the data may correspond to certain functions of the remote control 120. Accordingly, if certain functions of the remote control fail to be received by the video or audio component 110 over multiple attempts, the video or audio component 110 could indicate diagnostic information for that function using the signal quality indicator 115, discussed in further detail below.

In one embodiment, for example, the data sequence can be stored on the memory 112 at the factory. The memory 112 may be any type of memory. In one embodiment, the memory 112 may be shared by other video or audio component systems. For example, the video or audio component 110 could include a digital video recorder (DVR) capable of storing television programs on a hard drive. Accordingly, in this embodiment, the hard drive may be used as the memory 112. In other embodiments, the memory 112 can be a separate memory.

The video or audio component 110 further includes a signal receiver 113 coupled to the controller 111. The signal receiver 113 may use infrared signals, radio frequency (RF) signals, ultrasound signals or any other type of signal to communicate with the remote control 120. The signal receiver 113 receives a data sequence from the remote control 120 which will be compared by the controller 111 to the data sequence stored in memory 112, as discussed in further detail below. In another embodiment, the signal receiver 113 may be a transceiver capable of both transmitting and receiving signals. In this embodiment, the controller 111 may cause the signal transceiver 113 to transmit the data sequence stored in the memory 112 and the remote control may perform the quality measurement, as discussed in further detail below.

The video or audio component 110 may further include a quality measurement interface 114 coupled to the controller 111. The quality measurement interface 114 may be, for example, a button (hard or soft) on the video or audio component 110. In one embodiment, for example, the quality measurement interface 114 can be used to initiate the quality measurement process. In this embodiment, if a user interacts with the quality measurement interface 114, the controller 111 may initiate the transmission of the data sequence stored in the memory 112. In another embodiment, when the user interacts with the quality measurement interface 114, the controller 111 may monitor the signal receiver 113 for a data sequence from the remote control 120.

In another embodiment, for example, the controller 111 may constantly monitor for a data sequence from the remote control 120. In this embodiment, the remote control 120 may transmit a header with the data sequence, where the header instructs the controller 111 that a quality measurement data sequence is forthcoming.

The video or audio component 110 may further include a signal quality indicator 115. The signal quality indicator 115 may be a display, a speaker or a combination thereof. The controller 111 can use the display and/or the speaker to indicate a quality of the signal between the video or audio component 110 and the remote control 120. The display may illustrate the signal quality in any manner. For example, the display may display a percentage of data successfully received, or an indication if the percentage of data successfully received was above or below a predetermined threshold. Likewise, the speaker may illustrate the signal quality in any manner. For example, the speaker could output a beep or a series of beeps indicating the quality of the signal. In other embodiments, for example, the speaker may output a predetermined message based upon the quality of the signal.

The remote control 120 includes a controller 121. Various controllers 121 that may be used include, but are not limited to, central processing units (CPUs), graphical processing units (GPUs), application specific integrated circuits (ASICs), field programmable gate arrays (FPGAs), microcontrollers, or any other type of processor or logic device. The controller 121 is used to interact with the video or audio component 110, for example, by requesting a channel to be changed or a volume change. The controller 121 also controls the quality measurement process, as discussed in further detail below.

The controller is coupled to a memory 122. The memory 122 stores the same data sequence stored in the memory 112 of the video or audio component 110 that is used to test the quality of the signal between the video or audio component 110 and remote control 120. In one embodiment, for example, the data sequence can be stored on the memory 122 at the factory. In one embodiment, for example, the data sequence may be transferred from the video or audio equipment 110 to allow for different sequences. The memory 122 may be any type of non-volatile memory.

The remote control further includes a signal receiver 124 coupled to the controller 121. The signal receiver 124 may use infrared signals, radio frequency (RF) signals, ultrasound signals or any other type of signal to communicate with the video or audio component 110. The signal receiver 124 transmits the data sequence stored in the memory 122 to the video or audio component 110 to be compared by the controller 111 to the data sequence stored in memory 112, as discussed in further detail below. In another embodiment, the signal receiver 124 may be a transceiver capable of both transmitting and receiving signals. In this embodiment, the controller 121 may monitor for a quality measurement data sequence transmitted by the video or audio component 110. In this embodiment, the controller 121 compares the received data sequence to the data sequence stored in memory 122 to determine the quality of the connection between the video or audio component 110 and remote control 120.

The remote control 120 may further include a quality measurement interface 123 coupled to the controller 121. The quality measurement interface 123 may be, for example, a button on the remote control 120. In one embodiment, for example, the quality measurement interface 123 can be used to initiate the quality measurement process. In this embodiment, if a user interacts with the quality measurement interface 123, the controller 121 may initiate the transmission of the data sequence stored in the memory 122. In another embodiment, when the user interacts with the quality measurement interface 123, the controller 121 may monitor the signal receiver 124 for a data sequence from the video or audio component 110. In another embodiment, for example, the controller 121 may constantly monitor for a data sequence from the video or audio component 110. In this embodiment, the video or audio component 110 may transmit a header with the data sequence, where the header instructs the controller 121 that a quality measurement data sequence is forthcoming.

The remote control 120 may further include a signal quality indicator 125. The signal quality indicator 125 may be a display, a speaker or a combination thereof. The controller 121 can use the display and/or the speaker to indicate a quality of the signal between the video or audio component 110 and the remote control 120. The display may illustrate the signal quality in any manner. For example, the display may display a percentage of data successfully received, or an indication if the percentage of data successfully received was above or below a predetermined threshold. Likewise, the speaker may illustrate the signal quality in any manner. For example, the speaker could output a beep or a series of beeps indicating the quality of the signal. In other embodiments, for example, the speaker may output a predetermined message based upon the quality of the signal.

FIG. 2 is a flow diagram illustrating a method for using a video or audio component 110 to measure the quality of the signal between a video or audio component 110 and remote control 120, in accordance with an embodiment. The method begins by initiating the signal quality measurement process (Step 210). As discussed above, the video or audio component 110 may have a quality measurement interface 114 which a user could interact with to start the signal quality measurement process. In another embodiment, the controller 111 may process data received by the signal receiver 113 and monitor for a signal quality measurement request from the remote control 120. Once the process is initiated, the controller 111 waits until the signal receiver 113 has received the data sequence from the remote control. (Step 220). In one embodiment, for example, the controller 111 may wait for a predetermined period of time after the user interacts with the quality measurement interface 114, after receiving the signal quality measurement request from the remote control 120, and/or after receiving the part of the data sequence from the remote control 120 before timing out and generating the signal quality data based upon the received data.

Once the entire data sequence is received, or the controller 111 times out the process, the controller 111 compares the received data sequence with the data sequence stored in the memory 112. (Step 230). The controller 111 then generates signal quality data based upon the comparison. (Step 240). The signal quality data indicates a quality of the connection between the video or audio component 110 and remote control 120. In one embodiment, for example, the controller 111 may count a number of missed indexed packets. In another embodiment, for example, the controller may count the number of incorrect bits in each packet. The controller 111 could also generate an error rate, such as a packet error rate (PER) or a bit error rate (BER) based upon the comparison. Any quantitative or qualitative measurement comparing the differences between the received data sequence and the stored data sequence can be made. In one embodiment, for example, the signal quality data may be based upon an acceptable signal quality threshold. The acceptable signal quality threshold, for example, may be set to a pre-determined level based on upon data sequence and measurement method employed. In one embodiment, for example, the acceptable signal quality threshold may be ninety percent, where ninety percent or more of the data received matches the data stored in the memory 112. In other embodiments, for example, the acceptable signal quality threshold may be ninety-nine percent, corresponding to one incorrect or unresponsive command from the remote control 120 for every one-hundred commands transmitted. The signal quality data may be based, for example, upon a comparison between a percentage of the received data which matched the stored data and the acceptable signal quality threshold.

Once the signal quality data has been generated, the controller 111 indicates a quality of the signal. (Step 250). As discussed above, the video or audio component 110 may include a signal quality indicator 115. In one embodiment, for example, the signal quality indicator 115 may visually display a percentage of the correct data received. In other embodiments, a scale may be presented, the scale corresponding to acceptable signal levels and unacceptable signal levels. In other embodiments, the signal quality indicator 115 may output a sound, such as a beep, buzz or a prerecorded message indicating that the signal quality is acceptable or unacceptable. In still other embodiments, both visual and audible messages may be presented to the user. In another embodiment, for example, the controller 111 may cause the signal transmitter 113 to transmit the signal quality data to the remote control 120. In this embodiment the remote control 120 can be configured to indicate the signal quality data.

FIG. 3 is a flow diagram illustrating a method for using a remote control 120 to measure the quality of the signal between a video or audio component 110 and remote control 120, in accordance with another embodiment. The method begins by initiating the signal quality measurement process (Step 310). As discussed above, the remote control 120 may have a quality measurement interface 123 which a user could interact with to start the signal quality measurement process. In another embodiment, the controller 121 may process data received by the signal transceiver 124 and monitor for a signal quality measurement request from the video or audio component 110. Once the process is initiated, the controller 121 waits until the signal receiver 124 has received the data sequence from the video or audio component 110. (Step 320). In one embodiment, for example, the controller 121 may wait for a predetermined period of time after the user interacts with the quality measurement interface 123, after receiving the signal quality measurement request from the video or audio component 110, and/or after receiving the part of the data sequence from the video or audio component 110 before timing out and generating the signal quality data based upon the received data.

Once the entire data sequence is received, or the controller 121 times out the process, the controller 121 compares the received data sequence with the data sequence stored in the memory 122. (Step 330). The controller 121 then generates signal quality data based upon the comparison. (Step 340). The signal quality data indicates a quality of the connection between the video or audio component 110 and remote control 120. In one embodiment, for example, the controller 121 may count a number of missed indexed packets. In another embodiment, for example, the controller may count the number of incorrect bits in each packet. The controller 121 could also generate various packet error rates (PER) or bit error rates (BER) based upon the comparison. Any quantitative or qualitative measurement comparing the differences between the received data sequence and the stored data sequence can be made. In one embodiment, for example, the signal quality data may be based upon an acceptable signal quality threshold. In one embodiment, for example, an acceptable signal quality threshold may be ninety percent, where ninety percent or more of the data received matches the data stored in the memory 122. In other embodiments, for example, the acceptable signal quality threshold may be ninety-nine percent, corresponding to one incorrect or unresponsive command from the remote control 120 for every one-hundred commands transmitted.

Once the signal quality data has been generated, the controller 121 indicates a quality of the signal. (Step 350). As discussed above, the remote control 120 may include a signal quality indicator 125. In one embodiment, for example, the signal quality indicator 125 may visually display a percentage of the correct data received. In other embodiments, a scale may be presented, the scale corresponding to acceptable signal levels and unacceptable signal levels. In other embodiments, the signal quality indicator 125 may output an audible sound, such as a beep, buzz or a prerecorded message indicating that the signal quality is acceptable or unacceptable. In still other embodiments, both visual and audible messages may be presented to the user. The signal quality data may be based, for example, upon a comparison between a percentage of the received data which matched the stored data and the acceptable signal quality threshold. In another embodiment, for example, the controller 121 may cause the signal transmitter 123 to transmit the signal quality data to the video or audio component 110. In this embodiment, for example, the video or audio component 110 can be configured to indicate the signal quality data.

FIG. 4 is a flow diagram illustrating a method for measuring the quality of the signal between a two remote controls 120, in accordance with an embodiment. The method begins by initiating the signal quality measurement process by one of the remotes 120 (Step 410). As discussed above, the remote control 120 may have a quality measurement interface 123 which a user could interact with to start the signal quality measurement process. In another embodiment, the controller 121 may process data received by the signal transceiver 124 and monitor for a signal quality measurement request from the other remote control 120. Once the process is initiated, the controller 121 waits until the signal receiver 124 has received the data sequence from the other remote control 120. (Step 420). In one embodiment, for example, the controller 121 may wait for a predetermined period of time after the user interacts with the quality measurement interface 123, after receiving the signal quality measurement request from the other remote control 120, and/or after receiving the part of the data sequence from the other remote control 120 before timing out and generating the signal quality data based upon the received data.

Once the entire data sequence is received, or the controller 121 times out the process, the controller 121 compares the received data sequence with the data sequence stored in the memory 122. (Step 430). The controller 121 then generates signal quality data based upon the comparison. (Step 440). The signal quality data indicates a quality of the connection between the remote controls 120. In one embodiment, for example, the controller 121 may count a number of missed indexed packets. In another embodiment, for example, the controller may count the number of incorrect bits in each packet. The controller 121 could also generate various packet error rates (PER) or bit error rates (BER) based upon the comparison. Any quantitative or qualitative measurement comparing the differences between the received data sequence and the stored data sequence can be made. In one embodiment, for example, the signal quality data may be based upon an acceptable signal quality threshold. In one embodiment, for example, an acceptable signal quality threshold may be ninety percent, where ninety percent or more of the data received matches the data stored in the memory 122. In other embodiments, for example, the acceptable signal quality threshold may be ninety-nice percent, corresponding to one incorrect or unresponsive command from the remote control 120 for every one-hundred commands transmitted.

Once the signal quality data has been generated, the controller 121 indicates a quality of the signal. (Step 450). As discussed above, the remote control 120 may include a signal quality indicator 125. In one embodiment, for example, the signal quality indicator 125 may visually display a percentage of the correct data received. In other embodiments, a scale may be presented, the scale corresponding to acceptable signal levels and unacceptable signal levels. In other embodiments, the signal quality indicator 125 may output an audible sound, such as a beep, buzz or a prerecorded message indicating that the signal quality is acceptable or unacceptable. In still other embodiments, both visual and audible messages may be presented to the user. The signal quality data may be based, for example, upon a comparison between a percentage of the received data which matched the stored data and the acceptable signal quality threshold.

Generally speaking, the various functions and features of methods 200, 300 and 400 may be carried out with any sort of hardware, software and/or firmware logic that is stored and/or executed on any platform. Some or all of methods 200, 300 and 400 may be carried out, for example, by the controllers 111 and/or 121 illustrated in FIG. 1. Further, various functions shown in FIGS. 2, 3 & 4 may be implemented using software or firmware logic. The particular hardware, software and/or firmware logic that implements any of the various functions shown in FIGS. 2, 3 & 4, however, may vary from context to context, implementation to implementation, and embodiment to embodiment in accordance with the various features, structures and environments set forth herein. The particular means used to implement each of the various functions shown in FIGS. 2, 3 & 4, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An entertainment device configured to measure a signal quality between the entertainment device and a remote control, comprising:
   a signal receiver;
   a memory configured to store a predetermined data sequence; and
   a controller coupled to the signal receiver and the memory, the controller configured to:
      receive a data sequence from the signal receiver transmitted from the remote control;
      compare the received data sequence to the predetermined data sequence; and
      generate signal quality data on the received data sequence based upon the comparison.

2. The entertainment device of claim 1, further comprising a display, wherein the signal quality data is displayed on the display.

3. The entertainment device of claim 1, further comprising a speaker, wherein the signal quality data is output from the speaker.

4. The entertainment device of claim 1, wherein the controller is further configured to:
   determine an error rate based upon the comparison; and
   generate the signal quality data based upon a the error rate and an acceptable signal quality threshold.

5. The entertainment device of claim 4, wherein the acceptable signal quality threshold is set to a pre-determined level based on upon data sequence and measurement method employed.

6. The entertainment device of claim 1, further comprising a quality measurement interface coupled to the controller, wherein the controller is further configured to initiate a measurement of the signal quality between the entertainment device and the remote control.

7. The entertainment device of claim 6, further comprising a signal transmitter coupled to the controller, wherein the controller is further configured to transmit the predetermined data sequence stored in the memory when a user interacts with the quality measurement interface.

8. A method for measuring a signal quality received by a set top box having a controller, a signal receiver coupled to the controller and a memory coupled to the controller, comprising:
   receiving, by the controller, a data sequence from the signal receiver transmitted from a remote control;
   comparing, by the controller, the received data sequence to a data sequence stored in the memory; and
   generating, by the controller, signal quality data based upon the comparison.

9. The method of claim 8, further comprising display, by the controller on a display, the signal quality data.

10. The method of claim 8, further comprising outputting, by a speaker coupled to the controller, the signal quality data.

11. The method of claim 8, wherein the comparing further comprises determining an error rate based upon the comparison.

12. The method of claim 11, wherein the generating further comprises comparing the error rate to an acceptable signal quality threshold.

13. The method of claim 8, wherein the signal quality measurement is initiated by the controller in response to user input to a quality measurement interface coupled to the controller.

14. The method of claim 13, further comprising transmitting, by a signal transmitter coupled to the controller, the data sequence stored in the memory in response to the user input to the quality measurement interface.

15. A remote control, comprising:
   a signal receiver;
   a memory configured to store a predetermined data sequence; and
   a controller coupled to the signal receiver and the memory, the controller configured to:
      receive a data sequence from the signal receiver transmitted from a set top box;
      compare the received data sequence to the predetermined data sequence; and
      generate signal quality data on the received data sequence based upon the comparison.

16. The remote control of claim 15, further comprising a display, wherein the signal quality data is displayed on the display.

17. The remote control of claim 15, wherein the controller is further configured to:
   determine an error rate based upon the comparison; and
   generate the signal quality data based upon a the error rate and an acceptable signal quality threshold.

18. The remote control of claim 15, further comprising a quality measurement interface coupled to the controller, wherein the controller is further configured to initiate a measurement of the a signal quality.

19. The remote control of claim 18, further comprising a signal transmitter coupled to the controller, wherein the controller is further configured to transmit the predetermined data sequence stored in the memory when a user interacts with the quality measurement interface.

20. The remote control of claim 15, further comprising a signal transmitter coupled to the controller, wherein the controller is further configured to transmit the signal quality data.

* * * * *